(No Model.)
F. HART.
COUNTER SHAFT.
No. 415,268.  Patented Nov. 19, 1889.
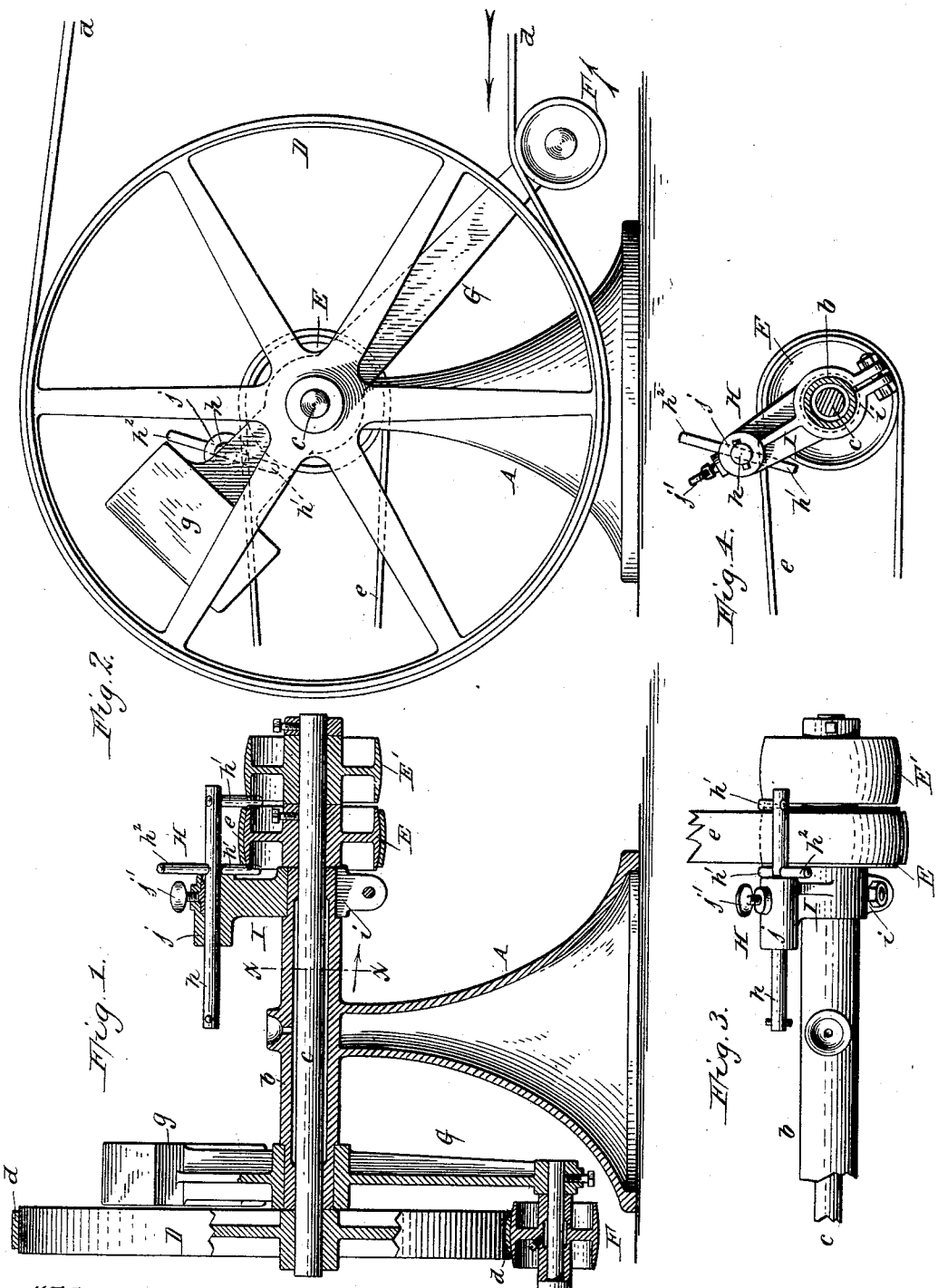
Witnesses:
Theo. L. Popp
Chester D. Howe
Frederick Hart, Inventor.
By Edward Wilhelm,
Attorney.

UNITED STATES PATENT OFFICE.

FREDERICK HART, OF POUGHKEEPSIE, ASSIGNOR TO D. H. BURRELL & COMPANY, OF LITTLE FALLS, NEW YORK.

COUNTER-SHAFT.

SPECIFICATION forming part of Letters Patent No. 415,268, dated November 19, 1889.

Application filed July 5, 1889. Serial No. 316,544. (No model.)

*To all whom it may concern:*

Be it known that I, FREDERICK HART, a subject of the Queen of England, residing at Poughkeepsie, in the county of Dutchess and State of New York, have invented a new and useful Improvement in Counter-Shafts, of which the following is a specification.

This invention relates more especially to the counter-shaft which is employed for the purpose of multiplying the speed between a centrifugal creamer or separator and the engine or shaft from which the creamer is driven.

The object of my invention is to provide the counter-shaft with simple and compact means for tightening, guiding, and shifting the driving-belts, and also to support the shaft in such manner that the belts may be readily applied to the pulleys on the shaft without requiring the bearings or other parts to be removed.

In the accompanying drawings, Figure 1 is a longitudinal sectional elevation of the parts. Fig. 2 is an end elevation of the counter-shaft and connecting parts. Fig. 3 is a fragmentary top plan view of the counter-shaft. Fig. 4 is a cross-section in line $x$ $x$, Fig. 1, looking toward the right, showing the manner of securing the adjustable guide-supporting bracket to the bearing.

Like letters of reference refer to like parts in the several figures.

A represents the hollow standard; $b$, a long cylindrical bearing arranged centrally at the upper end thereof, and $c$ the horizontal counter-shaft journaled in the bearing.

D is the large driving-pulley secured to one end of the counter-shaft, and $d$ is the belt which runs around said pulley and the driven pulley on the shaft of the centrifugal creamer, which latter pulley is not shown in the drawings.

E E' represent tight and loose pulleys arranged upon the opposite end of the counter-shaft, and $e$ is the driving-belt running around the tight pulley E and the pulley on the engine-shaft from which the power is derived.

F represents a tightener-pulley bearing against the lower advancing portion of the driving-belt $d$, adjacent to the periphery of the driving-pulley D, whereby the belt is kept taut. This tightener-pulley is journaled at the lower end of a lever G, which is loosely hung upon the reduced end portion of the cylindrical bearing $b$ on the inner side of the driving-pulley D, as represented in the drawings. This tightener-lever is provided at its upper end with an overhanging weight $g$, which tends to swing the lower arm of the lever upwardly and causes the tightener-pulley to constantly press against the outer surface of the belt, thereby automatically maintaining a tension on the belt at all times. The reduced end of the bearing forms a journal on which the tightener-lever swings, and the latter is confined on said journal between the hub of the adjacent pulley D and the shoulder formed by the reduced end portion of the bearing. The arrangement of the tightener-lever upon the end portion of the bearing forms a very compact and inexpensive construction, which dispenses with the use of a separate support or arbor for the lever.

H represents a belt guide and shifter whereby the driving-belt running around the tight and loose pulleys E E' is guided and shifted. This guide consists of a horizontal rod $h$, which is provided with the usual forks or pins $h'$ $h'$, between which the belt passes, and is mounted in an adjustable support or bracket I, arranged upon the adjacent cylindrical end of the bearing $b$. This support or bracket is capable of rotary adjustment on the bearing concentrically with the tight and loose pulleys E E', so that the bracket may be turned on its support into the proper position to accommodate the belt-guide to the position or direction of the belt. The inner portion of the supporting-bracket is provided with a split clamping-collar $i$, which embraces the reduced end of the bearing, and is secured thereto by a clamping-bolt passing through lugs or ears arranged at the ends of the clamping-collar, as clearly represented in Figs. 1 and 4.

The horizontal rod $h$ of the belt-guide is movably secured in an opening or bearing $j$ in the outer portion of the supporting-bracket I by means of a thumb-screw $j'$, arranged in a threaded opening in the bracket and bearing against said rod. Upon loosening the thumb-screw the guide may be moved laterally in the bracket to shift the belt from the tight to the loose pulley, or vice versa. After the belt is shifted the thumb-screw is again tightened. The movable rod of the shifter is provided with a handle $h^2$ for moving it.

The adjustability of the belt guide and shifter circumferentially with reference to the pulleys is very desirable in connection with the counter-shaft, from which a centrifugal creamer is driven, as the location of the engine or driving-shaft with reference to the machine and the direction in which the driving-belt approaches the pulleys of the counter-shaft vary in different creameries.

By supporting the counter-shaft centrally by means of a single standard and arranging the driving-pulleys and other parts at opposite ends of the shaft endless belts can be readily applied to the pulleys without the necessity of removing bearings or other parts, as is the case when the shaft is supported at its ends and the pulleys are arranged between two supporting-standards.

When the shaft is supported in separate bearings by two separate standards, as heretofore arranged, it is difficult to properly align the bearings to prevent springing of the shaft, and both standards must be very accurately placed, which requires skilled labor.

By my improved arrangement the shaft is supported centrally in a single long bearing, which avoids the liability of springing or bending the shaft and enables the same to be placed in position by unskilled persons. In case the base of the standard is not perfectly flat and true its hollowness renders it sufficiently elastic to allow it to yield slightly and to be firmly secured in place without perceptibly affecting the position of the bearing and shaft. This arrangement of the parts also renders the counter-shaft very compact, and, as the tightener-lever and the bracket of the belt-shifter are supported at opposite ends of the bearing, no separate supports for these parts are required.

The standard supporting the shaft may be secured to the floor, as shown, or it may be used as a hanger by inverting it and suspending it from the ceiling.

I claim as my invention—

1. The combination, with a bearing and a shaft mounted therein and provided with a pulley, of a belt running around said pulley, a tightener-pulley bearing against the belt, and a weighted tightener-lever pivoted concentrically with said shaft and carrying said tightener-pulley, substantially as set forth.

2. The combination, with a bearing provided with a cylindrical portion and a counter-shaft journaled therein, of a pulley arranged on said shaft, a belt running around said pulley, a tightener-pulley bearing against the belt, and a weighted tightener-lever pivoted upon the cylindrical portion of said bearing and carrying the tightener-pulley, substantially as set forth.

3. The combination, with a shaft having a tight and a loose pulley, of a supporting arm or bracket capable of rotary adjustment circumferentially to said pulleys and provided at its outer portion with a bearing, a shipper-rod arranged to slide in said bearing parallel with the shaft and provided with shifting-pins or forks, and a fastening device whereby the shipper-rod is clamped in its bearing, substantially as set forth.

4. The combination, with a standard having a cylindrical bearing at its upper end, of a counter-shaft arranged in said bearing, a pulley arranged at one end of said shaft, a weighted tightener arm or lever mounted on the adjacent end of the bearing on the inner side of said pulley and carrying a tightener-pulley, tight and loose pulleys arranged at the opposite end of said shaft, and a belt-guide arranged on the inner side of said pulleys and supported upon the adjacent end of the bearing, substantially as set forth.

Witness my hand this 1st day of July, 1889.

FREDERICK HART.

Witnesses:
F. W. DAVIS,
GEO. H. SHERMAN.